Patented May 16, 1933

1,908,976

UNITED STATES PATENT OFFICE

ERNEST F. GRETHER AND GERALD H. COLEMAN, OF MIDLAND, MICHIGAN, ASSIGNORS TO THE DOW CHEMICAL COMPANY, OF MIDLAND, MICHIGAN, A CORPORATION OF MICHIGAN

NEW ARYLIDES OF 2.3-HYDROXY NAPHTHOIC ACID

No Drawing.   Application filed May 18, 1931.  Serial No. 538,254.

This invention relates to new arylides of 2.3-hydroxy-naphthoic acid, useful as dyestuff intermediates, and distinguished from those hitherto known in that the arylides hereinafter mentioned have the general formula

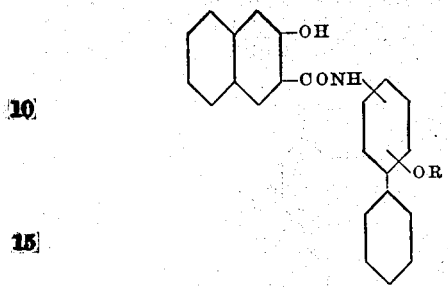

wherein R represents an alkyl, aryl or aralkyl group.

In our co-pending application, Serial No. 375,327, filed July 1, 1929, and entitled "Azo dyestuffs from ether-arylides of amino-hydroxydiaryls", azo dyestuffs prepared by coupling diazotized aromatic amines with arylides mentioned in this application are particularly described and claimed. An object of the present application, the subject matter of which is divided out of the above mentioned application Serial No. 375,327, is to describe the aforementioned new arylides of 2.3-hydroxy-naphthoic acid. Our invention, then, consists of the new arylides of 2.3-hydroxy-naphthoic acid together with the steps involved in making the same, hereinafter fully described and particularly pointed out in the claims, the following description setting forth certain procedure representative of the various ways in which the principle of our invention may be used.

The herein described new arylides of 2.3-hydroxy-naphthoic acid may be prepared by condensing said acid, in the presence of a condensing agent such as phosphorus trichloride or phosphorus pentoxide, with certain ethers of mono-hydroxy-3-amino-diphenyls having the general formula

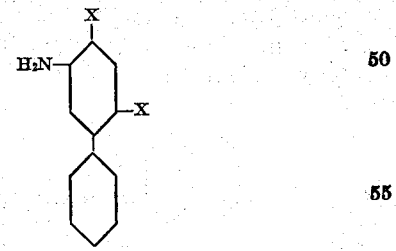

wherein one X represents hydrogen and the other X represents an alkoxy, aryloxy, or aralkoxy group.

A preferred manner in which arylides comprising the invention may be prepared is illustrated in the specific examples given below, it being understood, however, that such examples are not to be construed as a limitation on the invention.

Example 1

The 2.3-hydroxy-naphthoic acid arylide of 3-amino-4-methoxy-diphenyl is prepared by heating equimolecular quantities of said amino compound and 2.3-hydroxy-naphthoic acid in the presence of 12 per cent of their combined weight (slightly more than ⅓ of a molecular equivalent) of phosphorus trichloride, under reflux and with stirring and in the presence of sufficient toluene to permit such stirring for a period of from 3 to 5 hours. A slight excess of sodium carbonate over that necessary to neutralize the acid present is then added and the toluene removed by distilling with steam. The aqueous residue, containing the arylide product in suspension therein, is filtered and the residue washed with water. The product is then purified by dissolving in a dilute, 1 to 2 per cent, caustic alkali solution, preferably containing from 20 to 60 per cent of alcohol, filtering from the unreacted 3-amino-4-methoxy-diphenyl, and precipitating by acidification of the alkaline solution. The product so obtained is a fine, nearly white, crystalline powder having a melting point of approximately 201° C. It has probably the formula

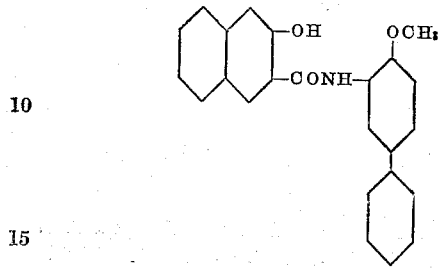

Example 2

By procedure similar to that described in Example 1, 3-amino-6-methoxy-diphenyl is condensed with 2.3-hydroxy-naphthoic acid. The product obtained is a fine, nearly white, crystalline powder, having a melting point of approximately 193° C., and having probably the formula

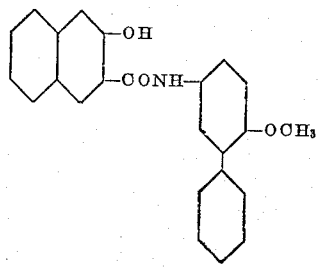

Example 3

By procedure similar to that described in Example 1, 3-amino-4-ethoxy-diphenyl is condensed with 2.3-hydroxy-naphthoic acid. The product is a fine, nearly white, crystalline powder, having a melting point of approximately 210° C., and having probably the formula

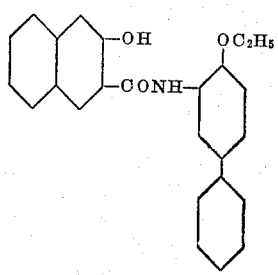

In a manner similar to that described above, other arylides of 2.3-hydroxy-naphthoic acid may be prepared by condensing the acid with other amino ethers of the present type, such as the mono-butoxy-, mono-phenoxy-, or mono-benzyloxy-amino-diaryls, the arylides so formed having in common the general formula

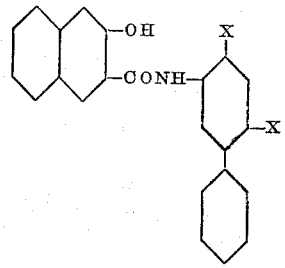

wherein one X represents hydrogen and the other X represents an alkoxy, aryloxy, or aralkoxy group.

Other modes of applying the principle of our invention may be employed instead of the one explained, change being made as regards the relative quantities of the various materials employed, provided the ingredients stated by any of the following claims or the equivalent of such stated ingredients be employed.

We therefore particularly point out and distinctly claim as our invention:—

1. In a process of making an arylide, the step which consists in condensing an ether of mono-hydroxy-3-amino-diphenyl, having the general formula

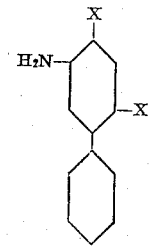

wherein one X represents hydrogen and the other X represents an alkoxy, aryloxy, or aralkoxy group, with 2.3-hydroxy-naphthoic acid, in the presence of a condensing agent selected from the group consisting of phosphorus trichloride and phosphorus pentoxide.

2. In a process of making an arylide, the step which consists in condensing mono-alkoxy-3-amino-diphenyl, having the general formula

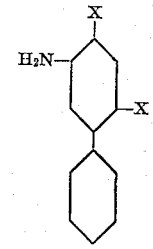

wherein one X represents hydrogen and the other X represents an alkoxy group, with 2.3-hydroxy-naphthoic acid in the presence of phosphorus trichloride.

3. In a process of making an arylide, the step which consists in condensing monomethoxy-3-amino-diphenyl, having the general formula

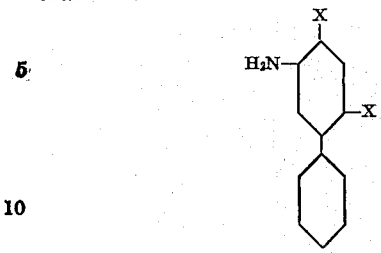

wherein one X represents hydrogen and the other X represents a methoxy group, with 2.3-hydroxy-naphthoic acid in the presence of phosphorus trichloride.

4. In a process of making an arylide, the step which consists in condensing mono-ethoxy-3-amino-diphenyl, having the general formula

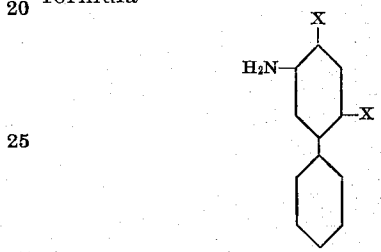

wherein one X represents hydrogen and the other X represents an ethoxy group, with 2.3-hydroxy-naphthoic acid in the presence of phosphorus trichloride.

5. In a process of making an arylide, the step which consists in condensing 3-amino-4-methoxy-diphenyl with 2.3-hydroxy-naphthoic acid in the presence of phosphorus trichloride.

6. In a process of making an arylide, the step which consists in condensing 3-amino-6-methoxy-diphenyl with 2.3-hydroxy-naphthoic acid in the presence of phosphorus trichloride.

7. In a process of making an arylide, the step which consists in condensing 3-amino-4-ethoxy-diphenyl with 2.3-hydroxy-naphthoic acid in the presence of a phosphorus trichloride.

8. As a new compound, a 2.3-hydroxy-naphthoic acid arylide having the general formula

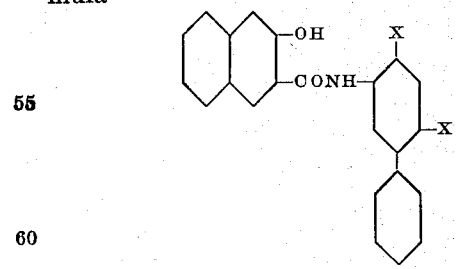

wherein one X represents hydrogen and the other X represents an alkoxy, aryloxy or aralkoxy group.

9. As a new compound, a 2.3-hydroxy-naphthoic acid arylide of mono-alkoxy-3-amino-diphenyl, such arylide having the general formula

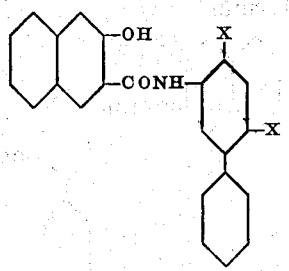

wherein one X represents hydrogen and the other X represents an alkoxy group.

10. As a new compound, a 2.3-hydroxy-naphthoic acid arylide of mono-methoxy-3-amino-diphenyl, such arylide having the general formula

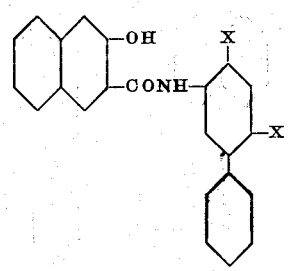

wherein one X represents hydrogen and the other X represents a methoxy group.

11. As a new compound, a 2.3-hydroxy-naphthoic acid arylide of mono-ethoxy-3-amino-diphenyl, such arylide having the general formula

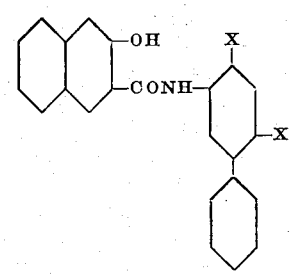

wherein one X represnts hydrogen and the other X represents an ethoxy group.

12. As a new compound, a 2.3-hydroxy-naphthoic acid arylide of 3-amino-4-methoxy-diphenyl, said arylide having a melting point of approximately 201° C. and having probably the formula

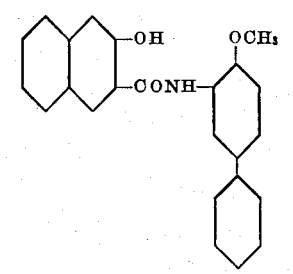

13. As a new compound, a 2.3-hydroxynaphthoic acid arylide of 3-amino-6-methoxy-diphenyl, said arylide having a melting point of approximately 193° C. and having probably the formula

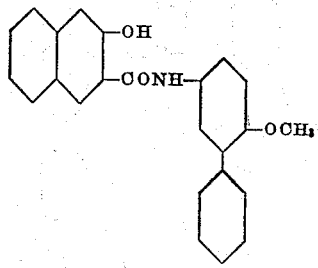

14. As a new compound, a 2.3-hydroxy-naphthoic acid arylide of 3-amino-4-ethoxy-diphenyl, said arylide having a melting point of approximately 210° C. and having probably the formula

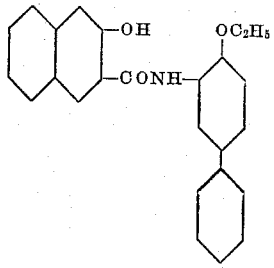

Signed by us this 28 day of April, 1931.
ERNEST F. GRETHER.
GERALD H. COLEMAN.